(12) United States Patent
Triandopoulos et al.

(10) Patent No.: US 10,091,204 B1
(45) Date of Patent: *Oct. 2, 2018

(54) CONTROLLING USER ACCESS TO PROTECTED RESOURCE BASED ON OUTCOME OF ONE-TIME PASSCODE AUTHENTICATION TOKEN AND PREDEFINED ACCESS POLICY

(71) Applicant: EMC IP Holding Company LLC, Hopkinton, MA (US)

(72) Inventors: Nikolaos Triandopoulos, Arlington, MA (US); John Brainard, Sudbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1013 days.

This patent is subject to a terminal disclaimer.

(21) Appl. No.: 14/266,192

(22) Filed: Apr. 30, 2014

Related U.S. Application Data

(63) Continuation-in-part of application No. 14/187,248, filed on Feb. 22, 2014, now Pat. No. 9,432,360, which
(Continued)

(51) Int. Cl.
*H04L 29/06* (2006.01)

(52) U.S. Cl.
CPC ........ *H04L 63/102* (2013.01); *H04L 63/0838* (2013.01); *H04L 63/0853* (2013.01);
(Continued)

(58) Field of Classification Search
CPC ........................... G06F 21/31; H04L 25/03929
See application file for complete search history.

(56) References Cited

U.S. PATENT DOCUMENTS

| 5,533,123 A | 7/1996 | Force et al. |
| 7,113,090 B1 | 9/2006 | Saylor et al. |

(Continued)

OTHER PUBLICATIONS

U.S. Appl. No. 13/828,588, filed Mar. 14, 2013, entitled, "Randomizing State Transitions for One-Time Authentication Tokens."

*Primary Examiner* — Dao Q Ho
(74) *Attorney, Agent, or Firm* — Ryan, Mason & Lewis, LLP

(57) ABSTRACT

Techniques are provided for controlling user access to a protected resource based on an outcome of a one-time passcode authentication token and one or more predefined access policies. An exemplary method comprises the steps of: providing an authentication passcode generated by a token associated with a user to at least one authentication processing device, wherein the user is attempting to access a protected resource; receiving an authentication outcome from the at least one authentication processing device, the authentication outcome comprising an acceptance outcome of the received authentication passcode and at least one of an acceptance outcome with respect to one or more different signals, such as a silent alarm and an acceptance outcome with respect to a drifting key; and providing access of the user to the protected resource based on the authentication outcome and a predefined access policy. Predefined access policies that are specific to silent alarm alerts and drifting key alerts are also provided.

23 Claims, 6 Drawing Sheets

Related U.S. Application Data is a continuation-in-part of application No. 14/144,712, filed on Dec. 31, 2013, now Pat. No. 9,407,631.

(52) U.S. Cl.
CPC ........ H04L 63/0884 (2013.01); H04L 63/105 (2013.01); H04L 63/1416 (2013.01)

(56) References Cited

U.S. PATENT DOCUMENTS

| | | |
|---|---|---|
| 7,129,072 B1 | 10/2006 | Schlessinger et al. |
| 7,725,730 B2 | 5/2010 | Juels et al. |
| 8,699,713 B1 | 4/2014 | Rivest et al. |
| 8,966,039 B1 | 2/2015 | Fultz et al. |
| 8,984,609 B1 | 3/2015 | Juels et al. |
| 9,008,303 B1 | 4/2015 | Juels et al. |
| 9,037,858 B1 | 5/2015 | Juels et al. |
| 9,083,515 B1 | 7/2015 | van Dijk et al. |
| 9,118,661 B1 | 8/2015 | Juels et al. |
| 9,225,717 B1 | 12/2015 | Brainard et al. |
| 9,270,655 B1 | 2/2016 | Juels et al. |
| 9,407,631 B1 | 8/2016 | Triandopoulos et al. |
| 9,432,360 B1 | 8/2016 | Triandopoulos et al. |
| 9,454,654 B1 | 9/2016 | Triandopoulos et al. |
| 9,515,989 B1 | 12/2016 | Juels et al. |
| 9,654,467 B1 | 5/2017 | Juels et al. |
| 2001/0053712 A1 | 12/2001 | Yoseloff et al. |
| 2002/0052230 A1 | 5/2002 | Martinek et al. |
| 2002/0165962 A1 | 11/2002 | Alvarez et al. |
| 2003/0026525 A1 | 2/2003 | Alvarez et al. |
| 2003/0063004 A1 | 4/2003 | Anthony et al. |
| 2003/0091267 A1 | 5/2003 | Alvarez et al. |
| 2003/0137426 A1 | 7/2003 | Anthony et al. |
| 2004/0054776 A1 | 3/2004 | Klotz et al. |
| 2004/0057389 A1 | 3/2004 | Klotz et al. |
| 2004/0059807 A1 | 3/2004 | Klotz et al. |
| 2004/0153863 A1 | 8/2004 | Klotz et al. |
| 2005/0060574 A1 | 3/2005 | Klotz et al. |
| 2005/0060598 A1 | 3/2005 | Klotz et al. |
| 2005/0076113 A1 | 4/2005 | Klotz et al. |
| 2005/0166263 A1* | 7/2005 | Nanopoulos ............ G06F 21/31 726/7 |
| 2009/0138303 A1 | 5/2009 | Seshadri et al. |
| 2009/0275805 A1 | 11/2009 | Lane et al. |
| 2011/0128163 A1 | 6/2011 | Gilleland et al. |
| 2012/0265976 A1 | 10/2012 | Spiers et al. |
| 2013/0145173 A1* | 6/2013 | Shablygin ............... G06F 21/34 713/185 |
| 2013/0212420 A1 | 8/2013 | Lawson et al. |
| 2014/0313303 A1 | 10/2014 | Davis et al. |
| 2014/0378810 A1 | 12/2014 | Davis et al. |

\* cited by examiner

FIG. 3

```
                                                                    ┌─ 300
┌──────────────────────────────────────────────────────────────────────┐
│ HashTag: DOT PRODUCT OPERATION OF SA AND MASK $x_t$ WHERE MASK IS EXTRACTED │
│ BY $R^t_{SA,c}$ CORRESPONDING TO CURRENT EPOCH t                     │
│                                                                      │
│ $Check_{SA}$: EQUALITY TEST OF INPUT HASH TAGS, PLUS UPDATE OF SA STATE ACCORDING │
│ TO A NEXT VALUE SA' IN A HASH CHAIN DEFINED BY SA SUCH THAT SA' • $x_t$=h' │
└──────────────────────────────────────────────────────────────────────┘
```

FIG. 4

```
                                                                    ┌─ 400
┌──────────────────────────────────────────────────────────────────────┐
│ UpdTag: DOT PRODUCTS OPERATIONS OF PORTIONS OF DK AND A SET OF MASKS │
│ CORRESPONDING TO PREVIOUS SUCCESSFUL LOGINS OF THE USER              │
│                                                                      │
│ $Check_{DK}$: CHECKS FEASIBILITY OF CURRENT SET OF EQUATIONS EXPRESSED BY │
│ PREVIOUS DOT PRODUCT EVALUATIONS AND THE CURRENT ONE $DK_t$ • $x_t$=upd' │
└──────────────────────────────────────────────────────────────────────┘
```

FIG. 5

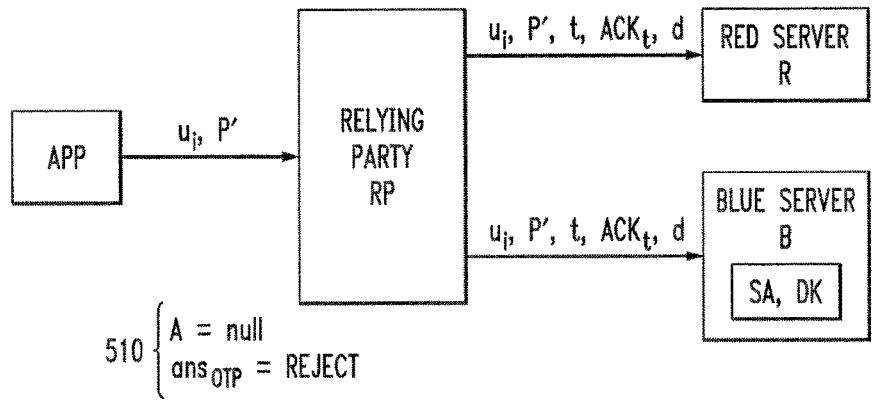

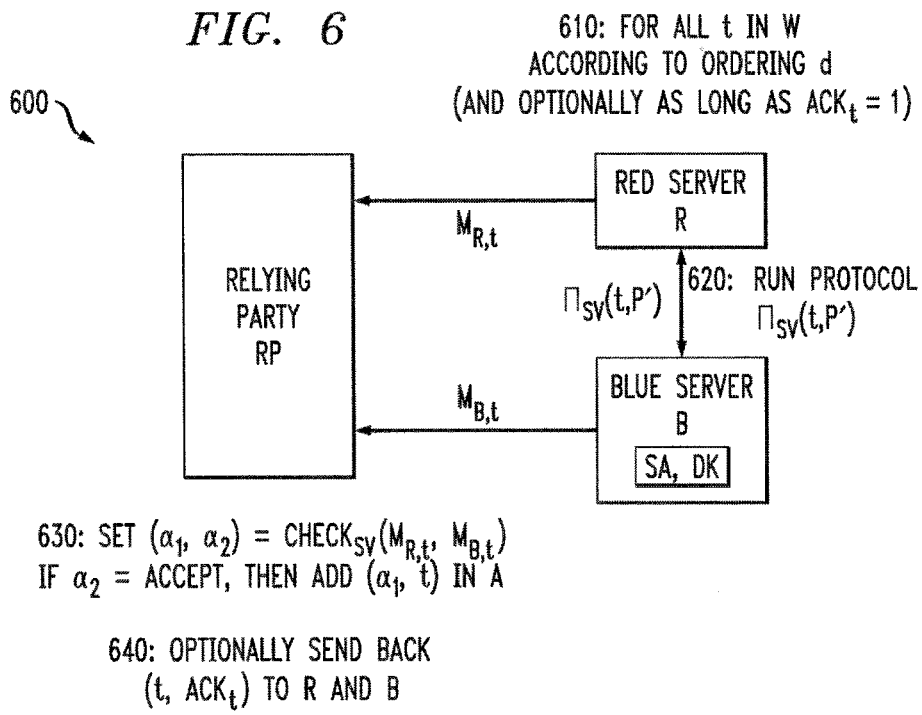
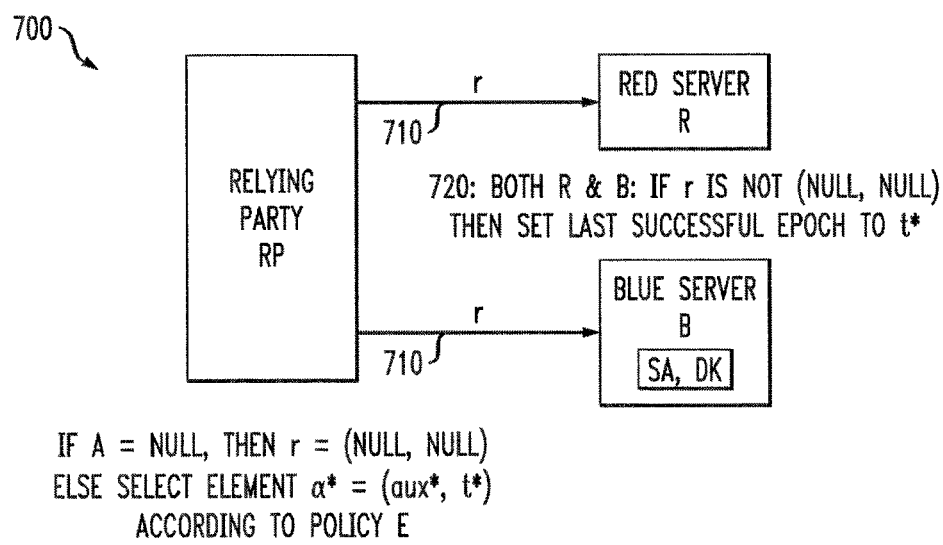

FIG. 8

SERVER B:
810: READ aux* AS $(aux^*_{SA}, aux^*_{DK})$
820: CHECK POSSIBLE ALERT USING
  • $(SA', RESULT_{SA}) = CHECK_{SA}(HashTag(SA, R^{t*}_{SA,b}), aux^*_{SA}, SA, R^{t*}_{SA,b})$
830: CHECK POSSIBLE INCONSISTENCY USING
  • $(DK', RESULT_{DK}) = CHECK_{DK}(UpdTag(DK, R^{t*}_{DK,b}), aux^*_{DK}, DK, R^{t*}_{DK,b})$
840: RETURN TO RP FINAL RESPONSE $r' = (f(SA, SA'), RESULT_{SA}, RESULT_{DK})$

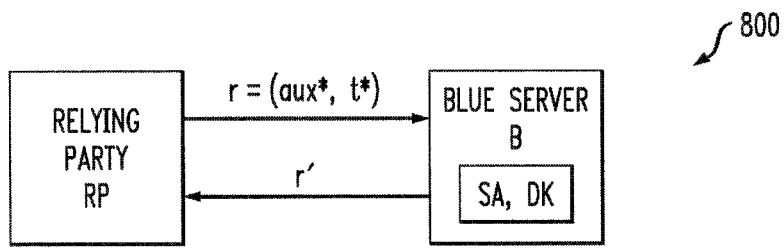

FIG. 9
FINAL RESPONSE

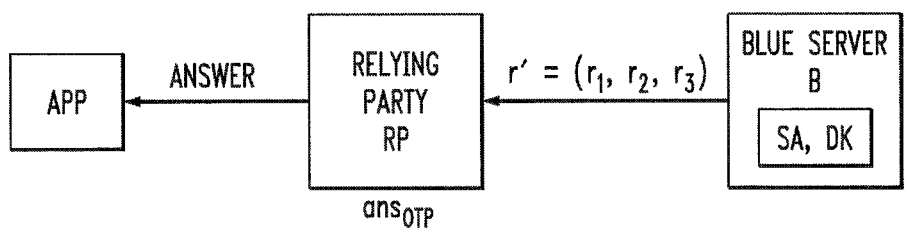

ANSWER = $(ans_{OTP}, ans_{SA}, ans_{DK})$

IF $r_2$ = ALERT, THEN $ans_{SA}$ = $REJECT_{SA,i}$ WHERE i POSSIBLE DEPENDS ON $r_1$
ELSE $ans_{SA}$ = $ACCEPT_{SA}$ IF $r_3$ = INCONSISTENT, THEN $ans_{DK}$ = $REJECT_{DK}$ ELSE $ans_{DK}$ = $ACCEPT_{DK}$

CONTROLLING USER ACCESS TO PROTECTED RESOURCE BASED ON OUTCOME OF ONE-TIME PASSCODE AUTHENTICATION TOKEN AND PREDEFINED ACCESS POLICY

CROSS-REFERENCE TO RELATED APPLICATIONS

The present application is a continuation-in-part application of U.S. patent application Ser. No. 14/187,248, filed Feb. 22, 2014 (now U.S. Pat. No. 9,432,360) entitled "Security-Aware Split-Server Passcode Verification for One-Time Authentication Tokens," which is a continuation-in-part application of U.S. patent application Ser. No. 14/144,712, filed Dec. 31, 2013 (now U.S. Pat. No. 9,407,631) entitled "Multi-Server Passcode Verification for One-Time Authentication Tokens with Auxiliary Channel Compatibility," each incorporated by reference herein.

FIELD

The field relates generally to authentication, and more particularly to single server and multi-server authentication.

BACKGROUND

One-time authentication tokens produce unpredictable one-time passcodes (OTP) typically by extracting pseudo-randomness from a secret seed, that is stored at the token and shared with the authentication server. To protect against server-side leakage of the underlying seed, tokens may employ split-server verification protocols (see, e.g., U.S. Pat. No. 7,725,730). In a split-server verification protocol, the underlying authentication secret is split into at least two partial secrets, each one kept by a distinct verification server, so that authentication of a user is performed at these servers in a distributed manner so that certain attacks against one or more servers can be tolerated.

A number of such split-server OTP verification protocols have been proposed. See, for example, U.S. patent application Ser. No. 13/404,737 (now U.S. Pat. No. 9,118,661), entitled "Method and Apparatus for Authenticating a User Using Multi-Server One-Time Passcode Verification;" U.S. patent application Ser. No. 13/795,801 (now U.S. Pat. No. 9,037,858), entitled "Distributed Cryptography Using Distinct Value Sets Each Comprising At Least One Obscured Secret Value;" and U.S. patent application Ser. No. 14/144,707 (now U.S. Pat. No. 9,454,654), entitled "Multi-Server One-Time Passcode Verification on Respective High Order and Low Order Passcode Portions."

Nonetheless, a need remains for an end-to-end server-side architecture for an OTP authentication system that simultaneously employs split-server verification and one or more of Silent Alarms (See, for example, U.S. patent application Ser. No. 13/404,788 (now U.S. Pat. No. 9,515,989), entitled "Methods and Apparatus for Silent Alarm Channels Using One-Time Passcode Authentication Tokens") and Drifting Keys (See, for example, U.S. patent application Ser. No. 13/250,225 (now U.S. Pat. No. 8,699,713), entitled "Key Update With Compromise Detection").

SUMMARY

Illustrative embodiments of the present invention provide techniques for controlling user access to a protected resource based on an outcome of a one-time passcode authentication token and one or more predefined access policies. According to one aspect of the invention, an exemplary method comprises the steps of: providing an authentication passcode generated by a token associated with a user to at least one authentication processing device, wherein the user is attempting to access a protected resource; receiving an authentication outcome from the at least one authentication processing device, the authentication outcome comprising an acceptance outcome of the received authentication passcode and at least one of an acceptance outcome with respect to one or more different signals, such as a silent alarm and an acceptance outcome with respect to a drifting key; and providing access of the user to the protected resource based on the authentication outcome and a predefined access policy.

The authentication outcome comprises, for example, one or more of an allowance of access, a denial of access, a silent alarm alert indicating a potential compromise of the token, a drifting key inconsistency between the received authentication passcode and one or more previously received authentication passcodes and a severe danger alert indicating at least two independent indications of a cloning of the token. The predefined access policy comprises, for example, one or more of the following actions: allowing the user full access to the protected resource; allowing the user restricted access to the protected resource; denying the user access to the protected resource; denying the user access to the protected resource and applying an additional secondary step-up authentication mechanism; and allowing the user restricted access to the protected resource in a non-functional manner such that the user is not notified that a potential attack has been detected.

Predefined access policies that are specific to silent alarm alerts and drifting key alerts are also provided.

Embodiments of the invention can be implemented in a wide variety of different authentication applications, including, for example, verification of one-time passcodes (OTPs).

BRIEF DESCRIPTION OF THE DRAWINGS

FIG. 3 illustrates an exemplary silent alarm protocol;

FIG. 4 illustrates an exemplary drifting key protocol;

FIG. 5 illustrates exemplary processing of a passcode by a relying party;

FIG. 6 illustrates an exemplary passcode search process;

FIG. 7 illustrates an exemplary state synchronization process;

FIG. 8 illustrates an exemplary auxiliary information processing process;

FIG. 9 illustrates an exemplary final response process for the relying party;

DETAILED DESCRIPTION

Figure 1:
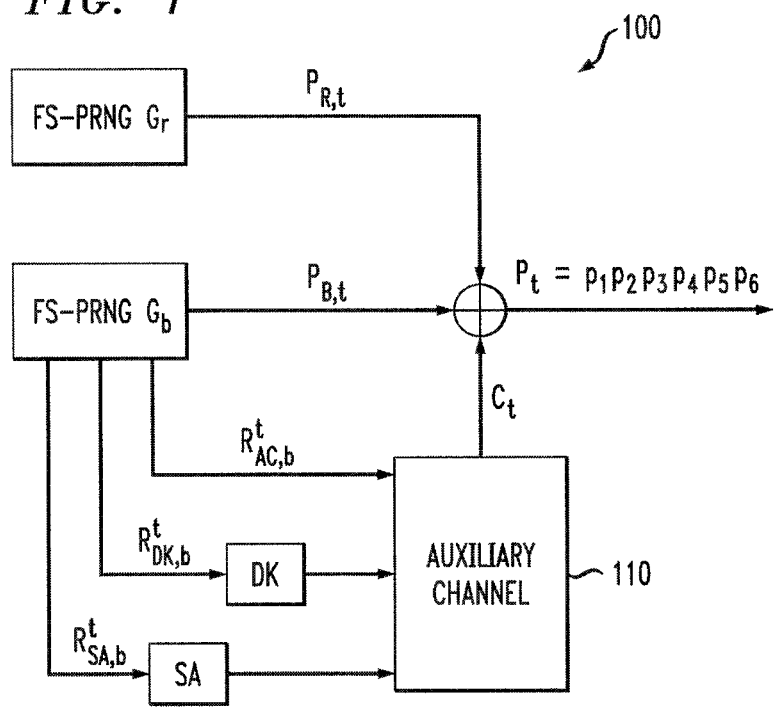
FIG. 1 illustrates an exemplary client-side generation of passcodes by a token.

Illustrative embodiments of the present invention will be described herein with reference to exemplary communication systems and associated servers, clients and other processing devices. It is to be appreciated, however, that the invention is not restricted to use with the particular illustrative system and device configurations shown. Accordingly, the term "communication system" as used herein is intended to be broadly construed, so as to encompass, for example, systems in which multiple processing devices communicate with one another but not necessarily in a manner characterized by a client-server model.

As will be described, the present invention in one or more illustrative embodiments provides efficient split-server OTP verification protocols that are compatible with the existence of an auxiliary channel that supports one or more of silent alarms and drifting keys. According to one aspect of the invention, a split-server verification protocol is provided where different servers are responsible for verifying different portions (substrings) of the submitted passcode. According to another aspect of the invention, at least one of the servers and the relying party extract embedded auxiliary information from a presented passcode that comprises one or more of a silent alarm and a drifting key.

One-Time Authentication

One-time authentication tokens produce a series of unpredictable one-time passcodes (OTPs) as second authentication factors for the authentication of users to remote servers. Passcodes are typically generated on a regular time basis, i.e., in specified time intervals often called epochs (e.g., the SecurID™ token produces a new OTP every one minute). Passcodes are derived by using some secret state, called a seed, that is stored at the token and also shared with the server. Tokens can either be based on software or hardware. Software tokens produce passcodes on-demand, whenever the token's application is launched in the host device, where a series of passcodes is generated for the epochs following the launching of the application. Hardware tokens produce passcodes on a permanent basis, one passcode per epoch, for the entire lifetime of their battery (e.g., for five years from the time of manufacture). Overall, such tokens produce a time-based series of unpredictable OTPs by extracting pseudorandom bits from their seed which are converted to passcodes.

There are three main steps in the functionality of exemplary one-time authentication tokens:

1. A passcode $P_{t'}$ is produced in time epoch t' through a one-way cryptographic function $f$ applied on the current epoch t', and the seed σ of the token. Software tokens specify their current epoch based on the host's device current time, whereas hardware tokens specify their epoch implicitly using a counter.

2. A passcode $P_{t'}$ may then be transmitted to an authentication server to authenticate a user to the server. The transmission of the passcode $P_{t'}$ to the server may happen either by typing performed by the user or automatically by a software token that is directly communicating to the server through a communication channel offered by the host device.

3. On receiving a candidate passcode $P_{t'}$, the server verifies this passcode by contrasting it against the passcode $P_t$ that is locally computed by the server, accepting the passcode if and only if $P_{t'}=P_t$. If the passcode is not accepted the user is not authenticated; otherwise, the user is authenticated if and only if a user's corresponding PIN is correct. Passcode $P_t$ is computed by the server by applying the same function $f$ on the current epoch t' specified by the server's current time and the seed σ of the token stored at the server. To tolerate small discrepancies between the current time of the software (or hardware) token and the current time of the server, $P_{t'}$ is also contrasted against other 2s passcodes that are defined by epochs that are neighboring epochs to the server's epoch t, that is, to passcodes $\{P_{t-s}, \ldots, P_{t-1}, P_t, P_{t+1}, \ldots, P_{t+s}\}$.

Future passcodes remain unpredictable even if an attacker has observed an arbitrarily long history of passcodes produced in the past, because passcodes are produced by applying a one way function $f$ on the token's seed, as long as the seed remains secret. Thus, future passcodes are protected against leakage to an attacker.

Protections Against Seed Leakage

Accordingly, the security of any one-time authentication token is impaired if an attacker gets access to the secret seed of the token: Using the seed, the attacker can clone the token. In turn, the attacker can increase its chances for impersonating the corresponding user, by either performing a brute-force attack on the user's PIN or by launching a more sophisticated man-in-the-middle attack for harvesting the user's PIN. In reality, the fact that the security of the token is based on a secret seed will motivate the attacker to go after this secret seed by following one of the following three attack patterns:

1. Server Compromise: The attacker may compromise the authentication server and get the secret seed of the tokens of one or more users. The attacker may compromise the server ephemerally by instantly stealing the seed(s), or permanently by remaining in control of the server for a period of time.

2. Token Tampering or Compromise: The attacker may compromise the token and get its secret seed by performing a direct attack against the host device of a software token or by physically tampering with a hardware token to directly read its seed.

3. Seed-Record Capturing: The attacker may get the secret seed of the token indirectly by attacking a storage or communication unit used to store or transfer the token's seed, or through side-channel attacks performed against the token or the server.

Although conventional one-time authentication tokens are vulnerable to all such seed-leakage attacks, a general solution has been recently proposed in U.S. patent application Ser. No. 13/837,259 (now U.S. Pat. No. 9,270,655), entitled "Configurable One-Time Authentication Tokens with Improved Resilience to Attacks," that involves the design of a configurable one-time authentication token which is equipped with several intrusion-detection, intrusion-resilience, tamper-resistance and token-visibility technologies that protect against the above attacks. The exemplary design optionally employs one or more of the following exemplary tamper-resistance and token-visibility techniques, as described in:

U.S. patent application Ser. No. 13/826,993 (now U.S. Pat. No. 9,654,467), entitled "Time Synchronization Solutions for Forward-Secure One-Time Authentication Tokens;"

U.S. patent application Ser. No. 13/828,588, entitled "Randomizing State Transitions for One-Time Authentication Tokens;"

U.S. patent application Ser. No. 13/826,924 (now U.S. Pat. No. 9,225,717), entitled "Event-Based Data-Signing Via Time-Based One-Time Authentication Passcodes;"

U.S. patent application Ser. No. 13/250,225 (now U.S. Pat. No. 8,699,713), entitled "Key Update With Compromise Detection;"

U.S. patent application Ser. No. 13/728,271 (now U.S. Pat. No. 9,083,515), entitled "Forward Secure Pseudorandom Number Generation Resilient to Forward Clock Attacks;"

U.S. patent application Ser. No. 13/404,780 (now U.S. Pat. No. 8,984,609), entitled "Method and Apparatus for Embedding Auxiliary Information in One-Time Passcodes;"

U.S. patent application Ser. No. 13/404,788 (now U.S. Pat. No. 9,515,989), entitled "Methods and Apparatus for Silent Alarm Channels Using One-Time Passcode Authentication Tokens;"

U.S. patent application Ser. No. 13/334,709 (now U.S. Pat. No. 9,008,303), entitled "Methods and Apparatus for Generating Forward Secure Pseudorandom Numbers;" and U.S. patent application Ser. No. 13/404,737 (now U.S. Pat. No. 9,118,661), entitled "Method and Apparatus for Authenticating a User Using Multi-Server One-Time Passcode Verification."

Each of the above-referenced patent applications are incorporated by reference herein.

The exemplary design also employs one or more of the following exemplary intrusion-detection, and instruction-resilience techniques. For a discussion of exemplary split-server passcode verification techniques, see, for example, U.S. patent application Ser. No. 13/404,737 (now U.S. Pat. No. 9,118,661), entitled "Method and Apparatus for Authenticating a User Using Multi-Server One-Time Passcode Verification;" U.S. patent application Ser. No. 13/795,801 (now U.S. Pat. No. 9,037,858), entitled "Distributed Cryptography Using Distinct Value Sets Each Comprising At Least One Obscured Secret Value;" and U.S. patent application Ser. No. 14/144,707 (now U.S. Pat. No. 9,454,654), entitled "Multi-Server One-Time Passcode Verification on Respective High Order and Low Order Passcode Portions," each incorporated by reference herein.

For a discussion of exemplary silent alarm techniques, see, for example, U.S. patent application Ser. No. 13/404,788 (now U.S. Pat. No. 9,515,989), entitled "Methods and Apparatus for Silent Alarm Channels Using One-Time Passcode Authentication Tokens" incorporated by reference herein. For a discussion of exemplary Drifting Keys techniques, see, for example, U.S. patent application Ser. No. 13/250,225 (now U.S. Pat. No. 8,699,713), entitled "Key Update With Compromise Detection," incorporated by reference herein. Silent alarms and drifting keys further employ the use of an auxiliary channel. See, for example, U.S. patent application Ser. No. 13/404,780 (now U.S. Pat. No. 8,984,609), entitled "Method and Apparatus for Embedding Auxiliary Information in One-Time Passcodes," incorporated by reference herein.

Extensions of the exemplary split-server passcode verification protocols are disclosed herein that are compatible with the use of an auxiliary channel. See, for example, U.S. patent application Ser. No. 14/144,712 (now U.S. Pat. No. 9,407,631), entitled "Multi-Server Passcode Verification for One-Time Authentication Tokens with Auxiliary Channel Compatibility," incorporated by reference herein.

1. Split-Server Passcode Verification: This technique involves dispersing the task of verifying a candidate passcode (provided by a user or token) among two or more verification servers so that each such participating server $S_i$ stores only a partial secret state $\sigma_i$. Then, verification is securely implemented in a distributed manner so that leakage of one or more, but up to a specified threshold, partial secret states does not compromise the security of the token.

Typically, the seed is split into two pieces, often called the red and the blue partial seeds, stored separately by the red server and the blue server. Upon receiving a candidate passcode $P_{t'}$, the two servers interact through a secure protocol to jointly compute the passcode $P_t$ against which the candidate passcode is contrasted, and accordingly $P_{t'}$ is rejected if any of the two servers outputs "reject." This decision is typically made by a so-called relying party (RP) server that is stateless and responsible for the final decision about the acceptance of $P_{t'}$ based on the individual outputs of the red and the blue servers.

The additional feature of proactivization can be used according to which the partial states of the (e.g., two) servers evolve over time and where the servers periodically exchange secure descriptions (e.g., hashes) of their partial secret states, which are then used to create their new partial secret states.

2. Silent Alarms: This technique detects token compromise and eventually prevents certain impersonation attempts by an attacker. The token stores a secret silent alarm state SA that changes to a new state SA' once the token senses/detects a suspicious activity that indicates possible token compromise; this change serves as an alert flag. This change is performed in a forward-secure and stealthy manner. Even after the complete token compromise by an attacker, the new state SA' alone is not indicative of whether or not any alert flag has been raised (thus, the alert serves as a silent alarm) and the new state cannot be reverted to the old state (thus, the alarm cannot be shut off).

Using an auxiliary channel, the silent alarm state can be embedded into the passcodes produced by the token, and thus passed to the authentication server. By decoding and reading these states, the authentication server, in turn, can eventually learn about one or more raised alert flags and then appropriately handle the current authentication attempt by the user. Successful decoding of an embedded alert flag is a probabilistic event that happens with some positive probability. The alert flag will be eventually received in one of the next few transmitted passcodes. False negatives exist, but no false positives (other than with negligible probability). A received alert flag always indicates a suspicious (according to some alerting policy) event that happens at the token.

3. Drifting Keys: This technique detects token cloning and eventually prevents certain impersonation attempts by an attacker. The token stores a drifting key state DK that changes over time randomly. This random state change corresponds to a unique fingerprint of the token, which evolves over time at some low rate (e.g., a few new random bits are added to the state every week). These small changes in the token's drifting-key fingerprint are then embedded into the produced passcodes, and thus passed to the server. Thus, assuming some frequent enough usage of the token by the user, the server gradually learns (partially or completely) the token's fingerprint.

Because this randomly evolving fingerprint is unique over the lifetime of the token, if a cloned token starts reporting cloned drifting-key updates to the server, these will not match the drifting key updates reported by the original, cloned, token. Thus, as long as the original token and the cloned one are being used during some long enough time window by the legitimate user and the attacker respectively, with overwhelming probability the server will notice an inconsistency in the received fingerprint (even if the server only has partial knowledge of it). The server may not be able to distinguish the cloned token from the original one, but it will be alerted that a possible cloning attack has been performed and will react to this—according to a certain policy.

Again, successful decoding of an embedded DK update is a probabilistic event happening with some positive probability. Fingerprint updates will be eventually received in one of the next few transmitted passcodes. False negatives exist, but no false positives (other than with negligible probability). A received inconsistent drifting-key update always indicates a cloning attack against the token.

It is noted that all of the above three security mechanisms (as well as the underlying auxiliary channel) require the use of pseudorandomness, in particular, of a forward-secure pseudorandom number generator (FS-PRNG), e.g., as described in U.S. patent application Ser. No. 13/334,709 (now U.S. Pat. No. 9,008,303), entitled "Methods and Apparatus for Generating Forward Secure Pseudorandom Numbers." Forward security can be applied to management of the internal state of one-time authentication tokens. Instead of using a fixed global secret state, e.g., a seed, for the entire lifetime of the token, the secret state can evolve over time in a one-way cryptographic manner so that older states cannot be computed from newer states (e.g., new seeds may be computed using a one-way hash chain). By using elaborate hierarchical hashing schemes, it is possible to improve the server-side performance with respect to management of time-evolving seeds.

However, supporting simultaneously the use of all these three security mechanisms in an end-to-end integrated design of the server-side functionality of an OTP authentication token is not a trivial task. Typically, existing schemes, such as those referred to above as split-server authentication, silent alarm and drifting key schemes, implement only one of these mechanisms. Therefore, as noted above, there exists a need for designing a server-side architecture of an OTP authentication token that employs split-server authentication and simultaneously allows for one or more of silent alarms and drifting keys.

Server-Side Architecture

As noted above, one aspect of the invention provides an architectural design for the server-side operation of an OTP authentication token that fully supports split-server passcode verification, silent alarms and drifting keys. A corresponding client-side token design is assumed that supports all three of these mechanisms, for instance, the design of U.S. patent application Ser. No. 13/837,259 (now U.S. Pat. No. 9,270,655), entitled "Configurable One-Time Authentication Tokens with Improved Resilience to Attacks." In particular, the exemplary embodiment is based on the use of two FS-PRNGs, one called red or $G_r$ and one called blue or $G_b$, in support of the split-server passcode verification functionality.

The exemplary embodiment described herein support all three of the above security mechanisms, but the disclosed architecture can be simplified to support only one of the silent alarms or drifting keys mechanisms, as would be apparent to a person of ordinary skill in the art.

An asymmetric configuration is assumed, as the one used in U.S. patent application Ser. No. 13/837,259 (now U.S. Pat. No. 9,270,655), where the pseudorandomness required for supporting silent alarms, drifting keys and the underlying auxiliary channel is provided by only one of two FS-PRNGs in use, without loss of generality by the blue FS-PRNG $G_b$. Such an asymmetric configuration makes sense, as silent alarms and drifting keys (along with their underlying auxiliary channel) do not individually require any distributed-crypto or split-state technical considerations. However, simple extensions of the exemplary architectural design are presented where the silent alarms and/or drifting keys makes use of pseudorandomness that is derived by a different FS-PRNG (say the red one $G_r$) than the one employed by the underlying auxiliary channel (say the blue one $G_b$).

FIG. 1 illustrates an exemplary client-side generation of passcodes by a token 100. As shown in FIG. 1, the exemplary token 100 comprises a red and a blue FS-PRNG, $G_r$ and $G_b$, respectively, that produce protocodes $P_{R,t}$ and $P_{B,t}$, respectively, for each epoch t. Additionally, in the exemplary embodiment, the blue FS-PRNG $G_b$ produces pseudorandom information that is used for the auxiliary channel (AC), drifting keys (DK) and silent alarm (SA), which, in turn, is optionally used by the auxiliary channel 110 to embed additional information into the two produced protocodes, finally producing the transmitted passcode $P_t$.

Generally, $R_{T,c}{}^t$ denotes the pseudorandomness derived by FS-PRNG $G_c$, $c \in \{b,r\}$, (in server B or R) for epoch t and that is used in security mechanism T, $T \in \{AC, SA, DK\}$, where AC, SA and DK stand respectively from "auxiliary channel," "silent alarms" and "drifting keys."

The final exemplary passcode $P_t$ is computed using digit-wise modulo 10 addition of values $P_{R,t}$, $P_{B,t}$ and $c_t$, denoted here using operator $\oplus$ as $P_{R,t} \oplus P_{B,t} \oplus c_t$. In this manner, the final exemplary passcode $P_t$ optionally embeds the auxiliary information, such as a silent alarm and/or a drifting key. Thus, the final exemplary passcode $P_t$ can be referred to as an auxiliary-information enriched passcode.

Figure 2:
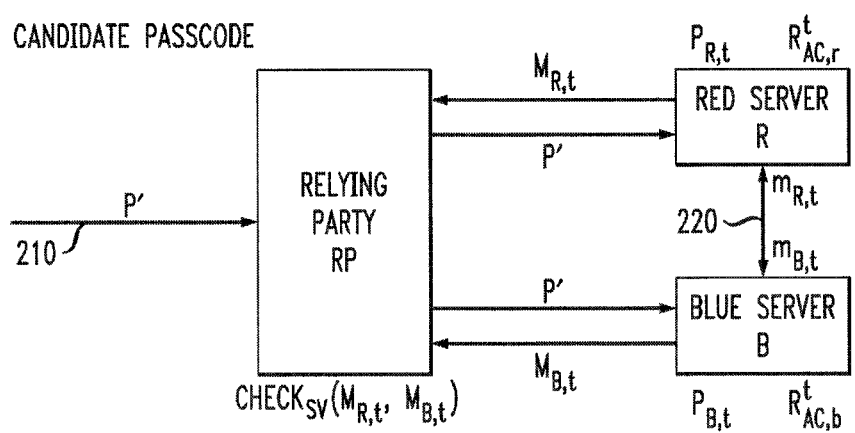
FIG. 2 illustrates an exemplary split-server passcode verification protocol.

To achieve generality in the disclosed server-side architectural design for OTP authentication tokens, first consider the following abstract descriptions of the three exemplary security mechanisms:

1. A split-server passcode verification protocol, shown in FIG. 2, (or simply split verification protocol) $\Pi_{SV}$, as in U.S. patent application Ser. No. 13/404,737 (now U.S. Pat. No. 9,118,661), entitled "Method and Apparatus for Authenticating a User Using Multi-Server One-Time Passcode Verification;" U.S. patent application Ser. No. 13/795,801 (now U.S. Pat. No. 9,037,858), entitled "Distributed Cryptography Using Distinct Value Sets Each Comprising At Least One Obscured Secret Value;" and U.S. patent application Ser. No. 14/144,707 (now U.S. Pat. No. 9,454,654), entitled "Multi-Server One-Time Passcode Verification on Respective High Order and Low Order Passcode Portions," is an interactive protocol run by the red server R and the blue server B where given as external input a candidate passcode P' and a time epoch t, it involves the following operations. As shown in FIG. 2, the exemplary split-server passcode verification process 200 is initiated during step 210 when an auxiliary-information enriched candidate passcode P' is presented to a relying party RP.

(a) Using as additional local input the protocode $P_{B,t}$ and pseudorandomness $R_{AC,b}{}^t$, server B computes (intermediate) message $m_{B,t}$;

(b) Using as additional local input the protocode $P_{R,t}$ (and possibly pseudorandomness $R_{AC,r}{}^t$, as in U.S. patent application Ser. No. 13/404,737 (now U.S. Pat. No. 9,118,661), entitled "Method and Apparatus for Authenticating a User Using Multi-Server One-Time Passcode Verification."), server R computes (intermediate) message $m_{R,t}$;

(c) Servers B and R exchange messages $m_{B,t}$ and $m_{R,t}$ during step 220 (possibly in multiple stateful interactions, e.g., when commitments are used as in U.S. patent application Ser. No. 13/404,737 (now U.S. Pat. No. 9,118,661));

(d) Servers B and R perform a final local computation and each outputs (final) message $M_{B,t}$ and respectively $M_{R,t}$;

(e) There exists a verification procedure $Check_{SV}$ which on input messages $M_{B,t}$ and $M_{R,t}$ outputs an auxiliary message aux and a boolean value accept or reject, written as (aux,{accept,reject})←$Check_{SV}(M_{B,t},M_{R,t})$.

For the above execution of protocol $\Pi_{SV}$, $$(M_{B,t},M_{R,t})←\Pi_{SV}(t,P').$$

Example instantiation of $\Pi_{SV}$: A possible instantiation of the above abstract protocol may be implemented according to U.S. patent application Ser. No. 14/144,712 (now U.S. Pat. No. 9,407,631), entitled "Multi-Server Passcode Verification for One-Time Authentication Tokens with Auxiliary Channel Compatibility," as follows. For a matrix A consisting of k rows of t-bit vectors, let $\overline{A}$ denote the high-order, left or most-significant half of the matrix consisting of k rows of $\lfloor t/2 \rfloor$ bits; and let $\underline{A}$ denote the low-order, right or least-significant half of the matrix A consisting of k rows of $\lceil t/2 \rceil$ bits. For instance, if A is [1234,5678], then $\overline{A}$=[12,56] and $\underline{A}$=[34,78]. Then, server B uses pseudorandomness $R_{AC,b}^{\ t}$ and a binary codebook B to compute a digital codebook $C_t$=$\overline{C_t}\underline{C_t}$, and sets $m_{B,t}$={$\underline{C_t},\underline{P}_{B,t}$}. Server R sets $m_{R,t}$=$\overline{P}_{R,t}$. Then, server B sets $\overline{I}_t$ to Ø, computes $\overline{d}_t$=$\overline{P}'\ominus\overline{P}_{R,t}\ominus\overline{P}_{B,t}$, where $\ominus$ may denote the digit-wise modulo 10 subtraction operation, and for each $\overline{c}_j\in\overline{C}_t$, $1\leq j\leq 2^k$, it checks if $\overline{c}_j=\overline{d}_t$ and if yes, then it sets $\overline{I}_t\leftarrow\overline{I}_t\cup j$; finally B sets $M_{B,t}$=$\overline{I}_t$. Analogously, R sets $\underline{I}_t$ to Ø, computes $\underline{d}_t$=$\underline{P}'\ominus\underline{P}_{R,t}\ominus\underline{P}_{B,t}$, and for each $\underline{c}_j\in\underline{C}_t$, $1\leq j\leq 2^k$, it checks if $\underline{c}_j=\underline{d}_t$ and if yes, then it sets $\underline{I}_t\leftarrow\underline{I}_t\cup j$; finally R sets $M_{R,t}$=$\underline{I}_t$. Moreover, given $\overline{I}_t$ and $\underline{I}_t$, the verification procedure $Check_{SV}$ outputs mathsfaccept if and only if $\overline{I}_t\cap\underline{I}_t\neq$Ø, in which case it sets aux=$\overline{I}_t\cap\underline{I}_t$. Otherwise, it outputs (⊥,reject).

2. A silent alarm protocol $\Pi_{SA}$, as in U.S. patent application Ser. No. 13/404,788 (now U.S. Pat. No. 9,515,989), entitled "Methods and Apparatus for Silent Alarm Channels Using One-Time Passcode Authentication Tokens," is a stateful protocol run by a server where given as external input a hash tag h' and a time epoch t, it involves the following operations:

(a) The server maintains state SA;

(b) Using as additional local input state SA and pseudorandomness $R_{SA,c}^{\ t}$, $c\in\{b,r\}$, the server computes a hash tag h; written as h←$HashTag(SA,R_{SA,c}^{\ t})$;

(c) There exists a verification procedure $Check_{SA}$ which on input hash tags h, h' and possibly pseudorandomness $R_{SA,c}^{\ t}$ and state SA, it outputs safe or alert and possibly updates state SA to SA'; ({⊥,SA'},{safe,alert})←$Check_{SA}$(h,h',SA,$R_{SA,c}^{\ t}$).

Example instantiation of $\Pi_{SA}$: FIG. 3 illustrates an exemplary instantiation 300 of the silent alarm protocol $\Pi_{SA}$ according to U.S. patent application Ser. No. 13/404,788 (now U.S. Pat. No. 9,515,989), as follows. State SA is seen as an m-bit binary string for some parameter m. Procedure $HashTag(SA,R_{SA,c}^{\ t})$ extracts a current (for epoch t) pseudorandom mask $x_t$ such that $|x_t|=|SA|$ and returns the dot product of $x_t\cdot SA$. Also, procedure $Check_{SA}$(h,h', SA,$R_{SA,c}^{\ t}$) returns alert if and only if h≠h', in which case SA' may be set to the next pseudorandom value according to a hash chain defined by $R_{SA,c}^{\ t}$ such that h'=HashTag (SA',$R_{SA,c}^{\ t}$) where the underlying pseudorandom mask used in the computation is $x_t$. Otherwise, it outputs (SA,safe) or (⊥,safe) depending on whether the SA state is to be updated.

3. A drifting key protocol $\Pi_{DK}$, as in U.S. patent application Ser. No. 13/250,225 (now U.S. Pat. No. 8,699,713), entitled "Key Update With Compromise Detection", is a stateful protocol run by a server where given as external input an update string upd' and a time epoch t, it involves the following operations:

(a) The server maintains state DK;

(b) Using as additional local input state DK and pseudorandomness $R_{DK,c}^{\ t}$, $c\in\{b,r\}$, the server computes an update tag upd; upd←$UpdTag(DK,R_{DK,c}^{\ t})$;

(c) There exists a verification procedure $Check_{DK}$ which on input the update tags upd and upd' and possibly pseudorandomness $R_{DK,c}^{\ t}$ and state DK outputs consistent or inconsistent and possibly updates state DK to DK'; ({⊥,DK'}, {consistent,inconsistent})←$Check_{DK}$(upd,upd',DK,$R_{DK,c}^{\ t}$).

Example instantiation of $\Pi_{DK}$: FIG. 4 illustrates an exemplary instantiation 400 of the drifting key protocol $\Pi_{DK}$ according to U.S. patent application Ser. No. 13/250,225 (now U.S. Pat. No. 8,699,713), as follows. State DK is seen as a binary string of size $l_t$ that increases over time, augmented to label some bits in this string as "unknown." Procedure UpdTag (DK,$R_{DK,c}^{\ t}$) extracts a current set $X_t$ (for epoch t) of pseudorandom masks $\{x_{1,t},\ldots,x_{k,t}\}$, such that $k\leq l_t$ is the total number of previously successful authentications by the user and $|x_{j,t}|$ equals the drifting-key state size n of the token (a scheme parameter), and returns (as the update tag upd) k dot products (bits) of the form $x_{j,t}\cdot DK_j$, where $DK_j$ is an appropriate n-bit substring of DK corresponding to the epoch of the j-th previously successful authentication by the user. Given the possible unknown bits in DK, the dot products $x_{j,t}\cdot DK_j$, $1\leq j\leq k$, along with tag upd define a set $E_t$ of k binary equations. Then, procedure $Check_{DK}$(upd,upd',DK,$R_{DK,c}^{\ t}$) returns inconsistent if and only if the set of binary equations $E_t\cup\{upd'=x_t\cdot DK_t\}$ is infeasible, where mask $x_t$ is extracted from $R_{DK,c}^{\ t}$ corresponding to current epoch t and $DK_t$ is a new n-bit string (possibly overlapping with that of DK, but definitely including some unknown bit values) corresponding to current epoch t. In this case DK' may be set to the binary string corresponding to the new system of equations expressed by $E_t\cup\{upd'=x_t\cdot DK_t\}$. Otherwise, it outputs (DK',consistent).

Exemplary Design

In one exemplary design, both the silent alarms and the drifting keys mechanisms are controlled by one of the two servers, the red server or the blue server without loss of generality by the blue server B.

1. The relying party RP is responsible for handling the authentication request by a user and making the final accept/reject decision on this authentication attempt;

2. Along with split verification, server B is responsible for maintaining and managing the silent alarm and drifting keys states of the system;

3. Server R is solely responsible for split verification.

The following multi-server protocol interaction takes place over the above architecture, where s denotes the appropriate slack parameter used to define the length of the exact search window W used by the server-side protocol:

1. User's Passcode Transcription. A user $u_i$ submits an OTP passcode P' to the high-level application APP;

2. Relying Party's Passcode Processing. As shown in FIG. 5, the relying party RP receives from a high-level application APP a pair $(u_i,P')$, where $u_i$ is the user performing the authentication attempt and P' the corresponding one-time passcode and performs the following processing:

(a) Initialization: FIG. 5 illustrates an exemplary initialization process 500. Initially, during step 510, the relying party RP sets A←Ø and $ans_{OTP}$←REJECT, and forwards $(u_i,P',t,ACK_t,d)$ to the two servers B and R, where t is the reference time epoch to which the authentication attempt made by the user corresponds, $ACK_t=1$ is an acknowledgement message controlling the search procedure (e.g., enforcing it to non-exhaustively terminate), and d is a specific traversal ordering of the time epochs that belong in the search window W.

(b) Passcode Search: FIG. 6 illustrates an exemplary passcode search process 600. During step 610, for each time epoch t in search window W that is retrieved by B and R, or optionally only by RP, (without repetition) according to traversal ordering d and optionally as long ACK=1, where ACK is the most recent $ACK_t$ sent by RP:

i. Servers B and R run the split-server passcode verification protocol $\Pi_{SV}$ during step 620, each time returning back to server RP the outputs $(M_{R,t}, M_{B,t}, t)$, where $(M_{R,t}, M_{B,t}, t) \leftarrow \Pi_{SV}(t, P')$;

ii. Then, during step 630, the server RP sets $(a_1, a_2) \leftarrow Check_{SV}(M_{R,t}, M_{B,t}, t)$ and if $a_2$=accept then it adds $(a_1, t)$ in A, i.e., $A \leftarrow A \cup \{a_1, t\}$.

iii. The server RP optionally sends back to servers B and R a message $(t, ACK_t)$ during step 640, where t is the next time epoch to be checked for verification, which is in turn selected by RP (without repetition) using the traversal ordering imposed by d over the time epochs that belong in the search window W, and $ACK_t \in \{0,1\}$ being a flag optionally denoting an early termination of the search.

(c) State Synchronization: FIG. 7 illustrates an exemplary state synchronization process 700. After the passcode search is complete, the two red and blue servers synchronize their state, according to the auxiliary information that has been embedded in the passcode and possibly extracted by the relying party RP as well as the corresponding time epoch during which a successful search was performed:

i. The server RP sends servers B and R a final response r during step 710, where r is computed by processing set A as follows:

A. If $A = \emptyset$, then RP sets $r = (\bot, \bot)$;

B. If $A \neq \emptyset$, then RP selects an element $a^* = (aux^*, t^*)$ in A according to an election policy E and sets $r = a^*$ and $ans_{OTP}$=ACCEPT.

ii. If $r \neq (\bot, \bot)$, then the red server R updates it local last successful epoch during step 720 to $t^* = r(2)$ (the second component of r).

iii. If $r \neq (\bot, \bot)$, then the blue server B updates it local last successful epoch during step 720 to $t^* = r(2)$ (the second component of r).

(d) Auxiliary Information Processing: FIG. 8 illustrates an exemplary auxiliary information processing process 800. As shown in FIG. 8, the blue server B performs the following processing of the auxiliary information $r = a^* = (aux^*, t^*)$ received during step 810:

i. Silent Alarm Check: During step 820, Server B sets $h' = aux_{SA}^*$, where $aux_{SA}^*$ is the silent-alarms portion of the auxiliary information (bit-string) aux* and using pseudo-randomness $R_{SA,b}^{t*}$, it first computes hash tag $h \leftarrow HashTag(SA, R_{SA,b}^{t*})$ on the current silent alarm state SA and then checks for an alert by running $(SA', result_{SA}) \leftarrow Check_{SA}(h, h', SA, R_{SA,b}^{t*})$.

ii. Drifting Keys Check: During step 830, Server B sets $upd' = aux_{DK}^*$, where $aux_{DK}^*$ is the drifting-keys portion of the auxiliary information (bit-string) aux* and using pseudo-randomness $R_{DK,b}^{t*}$, it first computes update tag $upd \leftarrow UpdTag(DK, R_{DK,b}^{t*})$ on the current drifting keys state DK and then checks for an inconsistency by running $(DK', result_{DK}) \leftarrow Check_{DK}(upd, upd', DK, R_{DK,b}^{t*})$.

iii. Final Status Response: During step 840, server B returns to server RP the final response $r' = (f(SA, SA'), result_{SA}, result_{DK})$, where $f$ is a distance function over SA and SA' states and $f(SA, SA') = \bot$ if SA' is $\bot$, and $result_{SA} = result_{DK} = \bot$ if $r = (\bot, \bot)$.

3. Relying Party's Final Response. FIG. 9 illustrates an exemplary RP final response process 900. As shown in FIG. 9, the server RP produces and returns to the high-level application APP the final answer by processing the final status response $r' = (r_1, r_2, r_3)$ received by server B, as follows:

(a) If $r_2$=alert then $ans_{SA} \leftarrow REJECT_{SA,i}$ (where i possibly depends on $r_1$, if $r_1 \neq \bot$), else $ans_{SA} \leftarrow ACCEPT_{SA}$;

(b) If $r_3$=inconsistent then $ans_{DK} \leftarrow REJECT_{DK}$, else $ans_{DK} \leftarrow ACCEPT_{DK}$;

(c) The server RP finally sets
answer=$(ans_{OTP}, ans_{SA}, ans_{DK})$.

As described, the exemplary protocol exhibits a natural trade off between communication and computation with respect to the concrete implementation of the passcode-search process of step 2.b. The relying party RP can either run the verification protocol $\Pi_{SV}$ as a subroutine, by communicating to servers B and R the next time epoch t that the verification needs to run on, or RP can completely outsource to servers B and R the complete passcode-search process, by communicating to them only the initial reference time epoch and receiving in batch the evaluations of protocol $\Pi_{SV}$ on every time epoch in the search window. Moreover:

(a) Depending on the configuration of the passcode-search process, the computation of the next time on which epoch protocol $\Pi_{SV}$ should run can be performed by RP or by both B and R. In any case, this computation can be controlled by the traversal ordering parameter d.

(b) Depending on the configuration of the passcode-search process, the termination condition of this process may be specified implicitly by exhaustively searching in the search window or explicitly by an acknowledgement message sent in each iteration by the relying party RP. Alternatively, a "kill" signal can be sent by RP to terminate the search process. These "ack" or "kill" signals are decided by RP based on whether or not a successful passcode has been found in the search window as well as the specified false positive or false negative authentication parameters of the system.

Depending on the specified false positive or false negative authentication parameters of the system, the election policy E controls the way collisions (which happen with negligible probability) may be handled by RP.

The exemplary final outcome format contains three pieces: $ans_{OTP}$ is the acceptance outcome with respect to the validity of the submitted passcode; $ans_{SA}$ is the acceptance outcome with respect to a possible cloning attack against the token; and $ans_{DK}$ is the acceptance outcome with respect to a possible seed-leakage attack against the OTP authentication system. The exact way with which the high-level application APP consumes the final authentication outcome answer is outside the scope of this invention. The exact way with which the high-level application APP can consume the final authentication outcome answer is described in the last section of this invention.

Alternative Design

In an exemplary alternative design, the silent-alarm state and drifting-keys state SA and DK, respectively, are stored and managed by the relying party RP, instead of being managed by the blue server B. This alternative configuration can have some important practical advantages in certain implementations of the disclosed split-server authentication system as it allows for more flexibility in managing the split-server authentication system (e.g., in implementing efficient recovery strategies).

Accordingly, the alternative design entails having server B communicating back to RP in the state synchronization step (c) the pseudorandomness $R_{SA,b}^{t*}$ and the pseudorandomness $R_{DK,b}^{t*}$, which are required in the computations of the auxiliary information processing step (d), and also having this step (d) run entirely by server RP.

Flexibility in Configurations

The silent alarms and drifting keys mechanisms are independent of one another. Thus, the silent alarms and/or drifting keys mechanisms can be added to or removed from any of the disclosed server-side system architectures (in particular, both the architecture of the first exemplary design and the architecture of the alternative design presented above) without any complications, in particular, even without any token-side design change in the case where a security mechanism is removed from the system architecture. For instance, in the first exemplary design described above, one of the two security mechanisms of silent alarms or drifting keys can be removed from the end system architecture by not storing the corresponding SA or DK state and not executing the corresponding procedures HashTag and Check$_{SA}$ or UpdTag and Check$_{DK}$ respectively, during the auxiliary information processing phase, thus not reporting in the final response phase any acceptance or rejection final state corresponding to the removed security mechanism.

Also, in both the first exemplary design and the alternative design described above, silent alarms and drifting keys, when supported, can be configured to be handled by any of the three parties, namely the red server R or the blue server B or the relying party RP, and independently of which server (the blue, the red or the replaying party) is responsible for handling the auxiliary-information channel. For instance, assuming that the client-side design is configured to provide pseudorandomness for silent alarms that is derived by the red forward-secure pseudorandom generator $G_r$, the silent alarm state can be handled (stored and processed) by the red server, and not by the blue server (as in the first exemplary design) or the relying party (as in the alternative design). In such a case, it is straightforward to appropriately adapt the protocols above to support any new configuration.

Single-Server Configuration

The full architectural design and implementation framework of the exemplary embodiments of the current invention assume the existence of two servers in the OTP authentication system, e.g., blue and red servers. In practice, many installations may have only a single server available. Implementing the security-aware split-server passcode verification techniques of the current invention on a single server may reduce the incremental security provided by the existence of two servers, but also allows for some efficiency improvements over an implementation based on two servers.

In general, using a single server has no real impact on the implementation or security of both silent alarms and drifting keys. One difference is with respect to the way passcodes are being verified. For instance, in some instantiations of the split-server passcode verification protocol, the full codeword (corresponding to an auxiliary channel) is computed and subtracted from the received passcode to obtain the protocode to be verified. That is, in this case, the exchange of partial codewords, as would be required by the full corresponding split-server passcode verification protocol, is not needed. However, depending on the exact single-server implementation, the security related to split-server passcode verification may lose a part of its security value. Indeed, in a single-server environment, both the red and blue protocodes are computed by the single server, and then combined to create the final protocode. It is noted that the seeds corresponding to the red and blue server can generally be maintained separately and the corresponding passcode-generation computations via the extraction of pseudorandomness can be done independently. This allows the possibility of migration from a single-server environment to a two-server configuration, should an additional server become available in the OTP authentication system in the future.

Figure 10:
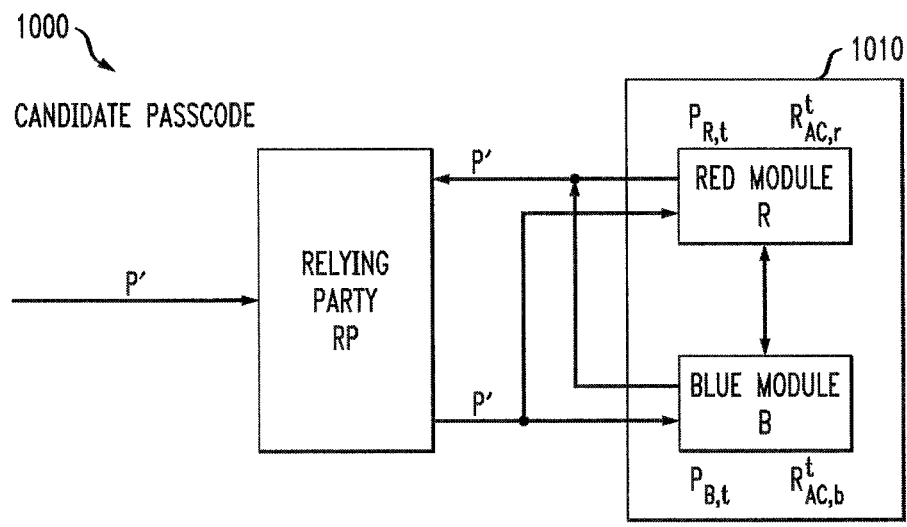
FIG. 10 illustrates an exemplary single server configuration that employs a split module configuration.

In particular, single-server configurations are also possible to support one or two of the silent alarms and drifting keys security mechanisms as described in the main or alternative designs presented above. Indeed, it is possible to configure an architecture where there is only one server and the relying party interacting in the passcode verification protocol by appropriately changing the procedures for implementing passcode search and passcode verification so that they are hosted at one physical machine. Two different exemplary schemes are distinguished to implement such a single-server configuration:

FIG. 10 illustrates an exemplary single server configuration 1000 that employs a split module configuration. The relying party RP and various exchanged values in FIG. 10 operate in a similar manner to FIG. 2. As shown in FIG. 10, however, the separate functionalities of the red and blue servers are preserved but they are now implemented as distinct software modules R and B coexisting in the same machine 1010, e.g., corresponding to two distinct processes running on the same physical or virtual execution environment. In other words, the token-side design supports the use of the red and blue forward-secure pseudorandom generators as discussed above, but now the server-side component of the OTP system does not employ these distinct portions as modules hosted by different machines/entities; instead these modules operate as before but are hosted by the same machine 1010. Alternatively, this configuration can be supported by only one software module that simultaneously handles the red and blue functionalities, i.e., one process that maintains both the red and the blue pseudorandomness secret states.

Figure 11:
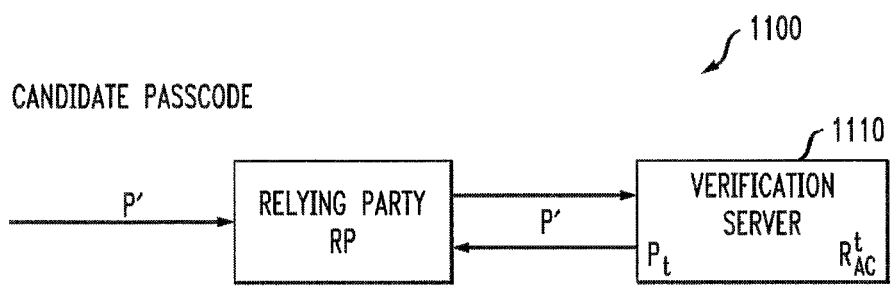
FIG. 11 illustrates an exemplary single server configuration that employs a single module configuration.

FIG. 11 illustrates an exemplary single server configuration 1100 that employs a single module configuration. As shown in FIG. 11, the red and blue portions of the OTP functionality are not supported by the token-side or by the server-side designs. Instead, there is only one forward-secure pseudorandom number generator that is employed, that is, one source of pseudorandomness used for the auxiliary channel and the silent alarms or the drifting keys security mechanisms. The separate functionalities of the red and blue servers are implemented by a single verification server 1110 that compares the presented passcode P' to a computed passcode $P_t$. It is straightforward to implement a passcode search and verification procedure that employs one such pseudorandom source: The server-side module searches in the search window to produce a passcode $P_t$ that matches the candidate passcode P' and produces valid auxiliary information (that is verified through the auxiliary channel functionality) which is, in turn, used by one or more of the two security mechanisms considered herein.

In the configurations of FIGS. 10 and 11, the silent-alarm and/or drifting key security mechanisms can be handled by either the server (and one of its two modules in the split-module configuration) or by the relying party, as described above.

Passcode Acceptance Policies

As explained above, the security features of silent alarms and drifting keys allow the authentication server(s) or the relying party to detect anomalous events that may, for instance, indicate either a physical compromise of the server or the compromise of the token's secret seed value.

Once such an anomalous event is detected, the server(s) or the relying party must determine how to respond especially in connection to the calling high-level application that consumes the authentication decision made by the OTP authentication system. The possible range of responses are determined both by the type of event and by the administrative policy in place on the server(s) or the relying party RP.

Let answer={$ans_{OTP}, ans_{SA}, ans_{DK}$} be the final answer produced by the split-server (or single-server) passcode verification protocol (in any of the configurations described above). A further aspect of the invention addresses possible reactions of the high-level application APP that performs the authentication request to the relying party RP. Conveniently, by denoting an accept state with 1, a reject state with 0, and an unset state with $\perp$, the final answer can be seen as a 3-bit value $a_2 a_1 a_0$.

Normal Outcome—If answer=111 or answer=0$\perp\perp$, then APP allows or respectively denies access to the provided service to the end user; here, denial of authentication is due to a mistyping or not having knowledge of the passcode.

Silent Alarm Alert—If answer=101 or answer=10$\perp$, then APP enters in silent-alarm alert mode; this means that a physical or software-based cloning of the token has been detected.

Drifting Key Inconsistency—If answer=110 or answer=1$\perp$0, then APP enters in drifting-key inconsistency mode; this means that it has been detected a general cloning of the token.

Severe Danger Alert—If answer=111, then APP enters a severe-danger alert mode; this means that there have been detected two independent indications of cloning of the token.

Depending on a predefined policy, in silent-alarm alert mode or drifting-key inconsistency mode, APP may respond as follows by employing one or more of the following actions:

Restricted Access—The user is allowed access but in a restricted way.

Step-Up Authentication Request—The user is not allowed to access the service but instead the user is requested to make use of an additional secondary step-up authentication mechanism.

Access Denial Only—The user is simply denied access.

Honeypot Access—The user is virtually provided access but in a non-functional manner (e.g., seeing fake information, or fake out-of-service message, or experiencing a different API) so that at the same time the system is not at risk by the logged-in possible attacker, but the possible attacker is not notified that the system knows about the underlying attack, therefore, identification and punishment measures can be applied.

Depending on policy, in severe-danger alert mode, APP may respond by a stricter reaction. For instance it may deny access of the user to the service, permanently inactivate the user's account and notify the system administrator about the need to investigate on this token cloning strong evidence.

Additional response strategies are described below for the authentication server(s) or the relying party RP or the high-level calling application. Cases for responses during a silent alarm alert mode or a drifting keys inconsistency mode are distinguished. As apparent to those skilled in art, any combination of the following responses can be adopted in practice.

Individual Responses in Silent Alarm Alert Mode

If a rejecting silent alarm state is detected at the server, i.e., an alert, this indicates a possible compromise of the token. Alternative methods of tamper response, such as zeroing the token's memory, alert the attacker that tampering has been detected. Silent alarms allow the option of detecting the tampering without alerting the attacker. This allows the administrator the option of monitoring and trying to identify the attacker rather than simply locking the attacker out.

A possible range of policy options for Silent Alarms (SA) is provided in the following table.

| Access Policy | Logging | Other Actions |
| --- | --- | --- |
| Deny All Access | Log SA State | Disable Token |
| Grant Limited Access | Log SA State | Extended Monitoring, Emergency Alert |
| Grant Full Access | Log SA State | Extended Monitoring, Emergency Alert |

The access policies in the table are described as follows:

Deny All Access—This is the most conservative option;

Grant Limited Access—This allows the possible attacker access to non-sensitive resources but locks out access to critical data;

Grant Full Access—Allows the full access to the user's resources;

The possible actions are:

Disable Token—Disable the token for future use, with administrator action required to re-enable the token;

Extended Monitoring—Activate detailed monitoring of the user's actions;

Emergency Alert—Send immediate notification of the event to the administrator, for example, by page, text-message, or other real-time communication.

The "Deny All Access" policy may seem to be the obvious choice, as it prevents any access to protected resources. It does, however, alert the attacker that tampering has been detected which negates one of the primary benefits of silent alarms. Choosing one of the less restrictive options, which grant either limited or full access, increases the immediate risk but raises the probability of identifying and catching the attacker and thus preventing future attacks. This is a tradeoff that can be managed by the administrator, based on the resources being protected and the monitoring capabilities of the infrastructure.

Individual Responses in Drifting Keys Alert Mode

For drifting keys, the policy options are slightly different, since it can be assumed that the attacker knows that the drift occurs, but cannot determine the random offset.

A possible range of policy options for Drifting Keys is provided in the following table.

| Access Policy | Logging | Other Actions |
| --- | --- | --- |
| Deny Access | Log DK State | Disable Token |
| Deny Access | Log DK State | Disable Token after Multiple Attempts |
| Grant Limited Access | Log DK State | Extended Monitoring, Emergency Alert |

The access policies in the table are described as follows:

Deny Access—This is the most conservative option;

Grant Limited Access—This allows the possible attacker access to non-sensitive resources but locks out access to critical data.

The possible actions are:

Disable Token—Disable the token for future use, with administrator action required to re-enable the token;

Disable Token after Multiple Attempts—Disable the token for future use, after a threshold number of failed attempts, with administrator action required to re-enable the token;

Extended Monitoring—Activate detailed monitoring of the user's actions;

Emergency Alert—Send immediate notification of the event to the administrator, for example, by page, text-message, or other real-time communication.

As with silent alarms, there is a tradeoff between immediate security and the desire to detect and possibly catch the attacker. Allowing limited access, possibly to specially created "honeypot" resources, may be a viable alternate to immediate denial of all access.

CONCLUSION

The foregoing applications and associated embodiments should be considered as illustrative only, and numerous other embodiments can be configured using the techniques disclosed herein, in a wide variety of different cryptography applications.

For example, both the split server and the auxiliary-channel handling methods described herein can be extended in the case of more than two servers, assuming a token-side design that supports such extensions. For instance, if a passcode comprises of three protocode parts, say red, blue and green, then vertical splitting can be considered into three corresponding parts. Splitting into more parts than the number of protocodes is also possible if the appropriate pseudorandom information is appropriately disseminated among the servers. Similarly, auxiliary-channel handling can be supported in multi-server settings.

It should also be understood that split-server verification, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The embodiments described herein can provide a number of significant advantages relative to conventional practice. For example, these embodiments can advantageously provide improved scalability and support of auxiliary channels. Also, a wide variety of different OTP verification protocols can be implemented using the disclosed techniques.

Authentication processes in other embodiments may make use of one or more operations commonly used in the context of conventional authentication processes. Examples of conventional authentication processes are disclosed in A. J. Menezes et al., Handbook of Applied Cryptography, CRC Press, 1997, which is incorporated by reference herein. These conventional processes, being well known to those skilled in the art, will not be described in further detail herein, although embodiments of the present invention may incorporate aspects of such processes.

The communication system may be implemented using one or more processing platforms. One or more of the processing modules or other components may therefore each run on a computer, storage device or other processing platform element. A given such element may be viewed as an example of what is more generally referred to herein as a "processing device."

Figure 12:
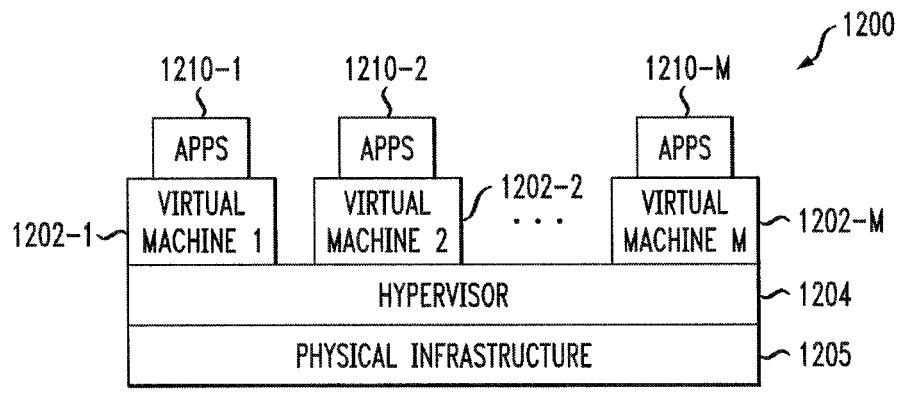
FIG. 12 illustrates an exemplary processing platform that may be used to implement at least a portion of one or more embodiments of the invention comprising a cloud infrastructure.

Referring now to FIG. 12, one possible processing platform that may be used to implement at least a portion of one or more embodiments of the invention comprises cloud infrastructure 1200. The cloud infrastructure 1200 in this exemplary processing platform comprises virtual machines (VMs) 1202-1, 1202-2, . . . 1202-M implemented using a hypervisor 1204. The hypervisor 1204 runs on physical infrastructure 1205. The cloud infrastructure 1200 further comprises sets of applications 1210-1, 1210-2, . . . 1210-M running on respective ones of the virtual machines 1202-1, 1202-2, . . . 1202-M under the control of the hypervisor 1204.

The cloud infrastructure 1200 may encompass the entire given system or only portions of that given system, such as one or more of client, servers, controller, authentication server or relying server in the system.

Although only a single hypervisor 1204 is shown in the embodiment of FIG. 12, the system may of course include multiple hypervisors each providing a set of virtual machines using at least one underlying physical machine.

An example of a commercially available hypervisor platform that may be used to implement hypervisor 1204 and possibly other portions of the system in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system.

Figure 13:
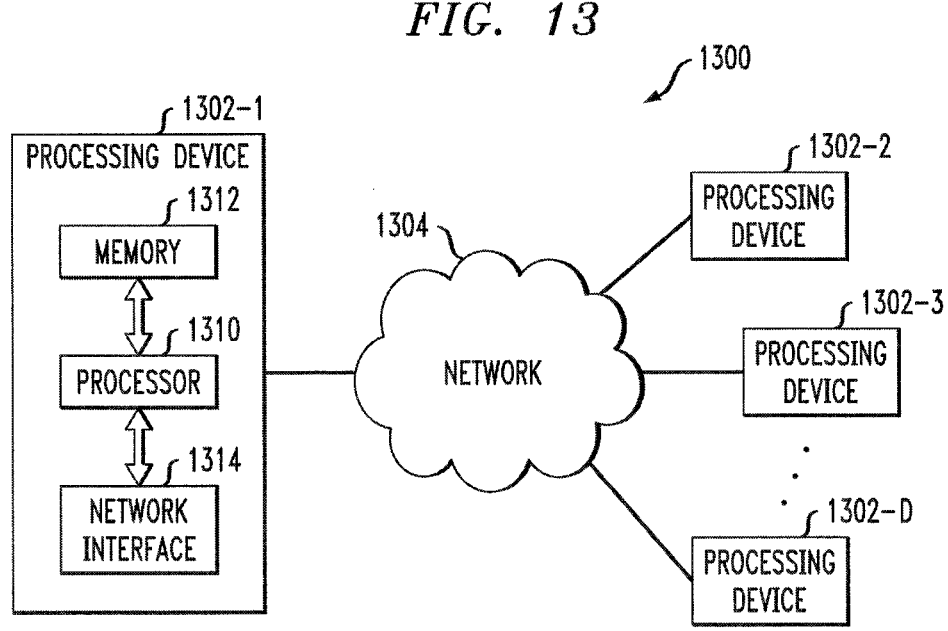
FIG. 13 illustrates another exemplary processing platform that may be used to implement at least a portion of one or more embodiments of the invention.

Another example of a processing platform is processing platform 1300 shown in FIG. 13. The processing platform 1300 in this embodiment comprises at least a portion of the given system and includes a plurality of processing devices, denoted 1302-1, 1302-2, 1302-3, . . . 1302-D, which communicate with one another over a network 1304. The network 1304 may comprise any type of network, such as a WAN, a LAN, a satellite network, a telephone or cable network, a cellular network, a wireless network such as WiFi or WiMAX, or various portions or combinations of these and other types of networks.

The processing device 1302-1 in the processing platform 1300 comprises a processor 1310 coupled to a memory 1312. The processor 1310 may comprise a microprocessor, a microcontroller, an ASIC, an FPGA or other type of processing circuitry, as well as portions or combinations of such circuitry elements, and the memory 1312, which may be viewed as an example of a "computer program product" having executable computer program code embodied therein, may comprise RAM, ROM or other types of memory, in any combination.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and the given system may include additional or alternative processing platforms, as well as numerous distinct processing platforms in any combination, with each such platform comprising one or more computers, storage devices or other processing devices.

Multiple elements of the system may be collectively implemented on a common processing platform of the type shown in FIG. 12 or 13, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a wide variety of other types of cryptographic devices and authentication systems that can benefit from distributed cryptography using distinct value sets as disclosed herein. Also, the particular configuration of communication system and processing device elements shown herein, and the associated authentication techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method, comprising:
providing an authentication passcode derived from a secret seed and generated by a token associated with a user to at least one authentication processing device, wherein said user is attempting to access a protected resource;
receiving an authentication outcome from said at least one authentication processing device, said authentication outcome comprising an acceptance outcome of the received authentication passcode and at least one of an acceptance outcome with respect to one or more of two different signals, wherein said at least one authentication processing device detects a loss of privacy of said secret seed by extracting and processing a silent alarm signal embedded in said received authentication passcode from said received authentication passcode, and wherein said silent alarm signal indicates an anomalous event detected by said token; and
controlling access of said user to said protected resource based on said authentication outcome and a predefined access policy invoked when said silent alarm signal has a predefined state indicating said detection of said anomalous event.

2. The method of claim 1, wherein said received authentication passcode further comprises a drifting key signal.

3. The method of claim 1, wherein said authentication outcome comprises one or more of an allowance of access, a denial of access, a silent alarm alert indicating a potential compromise of said token, a drifting key inconsistency between said received authentication passcode and one or more previously received authentication passcodes and a severe danger alert indicating at least two independent indications of a cloning of said token.

4. The method of claim 1, wherein said predefined access policy comprises one or more of the following actions: allowing said user full access to said protected resource; allowing said user restricted access to said protected resource; denying said user access to said protected resource; denying said user access to said protected resource and applying an additional secondary step-up authentication mechanism; and allowing said user restricted access to said protected resource in a non-functional manner such that said user is not notified that a potential attack has been detected.

5. The method of claim 1, wherein said access of said user is provided to said protected resource further based on an event type.

6. The method of claim 1, wherein said acceptance outcome with respect to said silent alarm signal comprises a silent alarm alert and wherein said predefined access policy comprises one or more of the following actions: allowing said user full access to said protected resource; allowing said user restricted access to said protected resource; and denying said user access to said protected resource.

7. The method of claim 1, wherein said acceptance outcome with respect to said silent alarm signal comprises a silent alarm alert and wherein said method further comprises a step of logging a silent alarm state.

8. The method of claim 1, wherein said acceptance outcome with respect to said silent alarm signal comprises a silent alarm alert and wherein said method further comprises one or more of the following steps: disabling said token, monitoring one or more actions of said user and sending a notification of said silent alarm alert to an administrator.

9. The method of claim 2, wherein said acceptance outcome with respect to said drifting key signal comprises a drifting key alert and wherein said predefined access policy comprises one or more of the following actions: allowing said user restricted access to said protected resource; and denying said user access to said protected resource.

10. The method of claim 2, wherein said acceptance outcome with respect to said drifting key signal comprises said drifting key alert and wherein said method further comprises a step of logging a drifting key state.

11. The method of claim 2, wherein said acceptance outcome with respect to said drifting key signal comprises said drifting key alert and wherein said method further comprises one or more of the following steps: disabling said token, disabling said token after a predefined number of failed attempts, monitoring one or more actions of said user and sending a notification of said drifting key alert to an administrator.

12. An apparatus, the apparatus comprising:
a memory; and
at least one hardware device, coupled to the memory, operative to:
provide an authentication passcode derived from a secret seed and generated by a token associated with a user to at least one authentication processing device, wherein said user is attempting to access a protected resource;

receive an authentication outcome from said at least one authentication processing device, said authentication outcome comprising an acceptance outcome of the received authentication passcode and at least one of an acceptance outcome with respect to one or more of two different signals, wherein said at least one authentication processing device detects a loss of privacy of said secret seed by extracting and processing a silent alarm signal embedded in said received authentication passcode from said received authentication passcode, and wherein said silent alarm signal indicates an anomalous event detected by said token; and control access of said user to said protected resource based on said authentication outcome and a predefined access policy invoked when said silent alarm signal has a predefined state indicating said detection of said anomalous event.

13. The apparatus of claim 12, wherein said received authentication passcode further comprises a drifting key signal.

14. The apparatus of claim 12, wherein said authentication outcome comprises one or more of an allowance of access, a denial of access, a silent alarm alert indicating a potential compromise of said token, a drifting key inconsistency between said received authentication passcode and one or more previously received authentication passcodes and a severe danger alert indicating at least two independent indications of a cloning of said token.

15. The apparatus of claim 12, wherein said predefined access policy comprises one or more of the following actions: allowing said user full access to said protected resource; allowing said user restricted access to said protected resource; denying said user access to said protected resource; denying said user access to said protected resource and applying an additional secondary step-up authentication mechanism; and allowing said user restricted access to said protected resource in a non-functional manner such that said user is not notified that a potential attack has been detected.

16. The apparatus of claim 12, wherein said access of said user is provided to said protected resource further based on an event type.

17. The apparatus of claim 12, wherein said acceptance outcome with respect to said silent alarm signal comprises a silent alarm alert and wherein said predefined access policy comprises one or more of the following actions: allowing said user full access to said protected resource; allowing said user restricted access to said protected resource; and denying said user access to said protected resource.

18. The apparatus of claim 12, wherein said acceptance outcome with respect to said silent alarm signal comprises a silent alai in alert and wherein said apparatus is further configured to log a silent alarm state.

19. The apparatus of claim 12, wherein said acceptance outcome with respect to said silent alarm signal comprises a silent alarm alert and wherein said apparatus is further configured to perform one or more of the following steps: disabling said token, monitoring one or more actions of said user and sending a notification of said silent alarm alert to an administrator.

20. The apparatus of claim 13, wherein said acceptance outcome with respect to said drifting key signal comprises a drifting key alert and wherein said predefined access policy comprises one or more of the following actions: allowing said user restricted access to said protected resource; and denying said user access to said protected resource.

21. The apparatus of claim 13, wherein said acceptance outcome with respect to said drifting key signal comprises a drifting key alert and wherein said apparatus is further configured to log a drifting key state.

22. The apparatus of claim 13, wherein said acceptance outcome with respect to said drifting key signal comprises a drifting key alert and wherein said apparatus is further configured to perform one or more of the following steps: disabling said token, disabling said token after a predefined number of failed attempts, monitoring one or more actions of said user and sending a notification of said drifting key alert to an administrator.

23. An article of manufacture, comprising a non-transitory machine readable recordable medium containing one or more programs which, when executed, implement the steps of:

providing an authentication passcode derived from a secret seed and generated by a token associated with a user to at least one authentication processing device, wherein said user is attempting to access a protected resource;

receiving an authentication outcome from said at least one authentication processing device, said authentication outcome comprising an acceptance outcome of the received authentication passcode and at least one of an acceptance outcome with respect to one or more of two different signals, wherein said at least one authentication processing device detects a loss of privacy of said secret seed by extracting and processing a silent alarm signal embedded in said received authentication passcode from said received authentication passcode, and wherein said silent alarm signal indicates an anomalous event detected by said token; and controlling access of said user to said protected resource based on said authentication outcome and a predefined access policy invoked when said silent alarm signal has a predefined state indicating said detection of said anomalous event.

\* \* \* \* \*